United States Patent
Sharma et al.

(10) Patent No.: US 8,589,956 B2
(45) Date of Patent: Nov. 19, 2013

(54) METHOD AND APPARATUS FOR PROVIDING APPLICATION WITH INTERFACE TO COMPOSITE NETWORK SERVICE

(75) Inventors: Alok Sharma, Lisle, IL (US); Yigang Cai, Naperville, IL (US)

(73) Assignee: Alcatel Lucent, Paris (FR)

( * ) Notice: Subject to any disclaimer, the term of this patent is extended or adjusted under 35 U.S.C. 154(b) by 410 days.

(21) Appl. No.: 13/077,630

(22) Filed: Mar. 31, 2011

(65) Prior Publication Data
US 2012/0254899 A1 Oct. 4, 2012

(51) Int. Cl.
G06F 9/46 (2006.01)
G06F 3/00 (2006.01)
G06F 15/16 (2006.01)

(52) U.S. Cl.
USPC .................. 719/328; 709/217; 715/738

(58) Field of Classification Search
None
See application file for complete search history.

(56) References Cited

U.S. PATENT DOCUMENTS

| | | | | |
|---|---|---|---|---|
| 2003/0061404 A1* | 3/2003 | Atwal et al. | | 709/328 |
| 2007/0113238 A1* | 5/2007 | Smirnov et al. | | 719/330 |
| 2008/0244091 A1* | 10/2008 | Moore et al. | | 709/246 |
| 2010/0088359 A1* | 4/2010 | Phillips et al. | | 709/203 |
| 2011/0035650 A1* | 2/2011 | Jardine-Skinner et al. | ... | 715/205 |
| 2012/0210335 A1* | 8/2012 | Salt et al. | | 719/315 |

OTHER PUBLICATIONS

"The Mobile App Gold Rush Speeds Up," Anchor Report, Yankee Group Research, Inc., shop.yankeegroup.com/product_img4.php?id=334&img=1, 2010, printed on Mar. 31, 2011, 1 page.
Alcatel-Lucent, "Open API Platform," www.alcatel-lucent.com/wps/portal/!ut/p/kcxml/04_Sj9SPykssy0xPLMnMz0vM0Y . . . , 2006, printed on Mar. 31, 2011, 1 page.
Alcatel-Lucent, "API Exposure Suite," www2.alcatel-lucent.com/application_enablement/application_exposure_suite_php, 2006, printed on Mar. 31, 2011, 2 pages.
Alcatel-Lucent, "Seizing the Digital Opportunity The New Application Paradigm," 2009, 7 pages.
Alcatel-Lucent, "Profiting from Data Growth in Wireline Networks Application Enablement use cases and business models," 2010, 11 pages.
Alcatel-Lucent, "Open API Service," 2010, 4 pages.
Alcatel-Lucent, "Open API Service, Network Technology Meets Smart Monetization: Build, manage and distribute profitable applications for consumers everywhere," 2010, 8 pages.

* cited by examiner

*Primary Examiner* — Charles E Anya
(74) *Attorney, Agent, or Firm* — Fay Sharpe LLP

(57) ABSTRACT

A method for providing an application with an interface to a composite network service. The interface is provided by an application enablement suite (AES) associated with a service composition framework (SCF) that includes an exposure engine and an application program interface (API) container that matches up to a request from the application for the composite network service. The API container includes an arrangement of composite service logic, composite enabler logic and composite normalization logic.

18 Claims, 16 Drawing Sheets

WEB SERVICE AND ENABLER LOGIC - SERVICE REQUEST

FIG. 12

| # | INTERFACE | OWN | TYPE | DESCRIPTION |
|---|---|---|---|---|
| 1 | API PROVIDER REGISTRATION | CE | REST | This interface allows the API provider suite to provision the API provider in the CE so that the appropriate policies and business models can be applied to the API request traffic. |
| 2 | API ON-BOARDING | CE | HTTP, JMX | This interface allows the API provider suite to on-board and makes available the appropriate set of APIs. |
| 3 | POLICY AND BIZ MANAGEMENT | CE | JMX | This interface allows the API provider suite to provision/manage the appropriate set of policies and associated context that are to be applied to APIs exposed by the CE. As part of these policies, there is a special set of policies which are related to the models associated with the APIs, so the business model definitions need to provision in the CE so that these policies can be enforced |
| 4 | TRANSACTION DATA | CE | SFTP | This is the API transaction data that is collected by the CE. This data is used for two purposes:<br>- Reporting data<br>- Billing data |
| 5 | MEASUREMENT DATA | CE | SFTP | This is the API measurement data that is calculated by the CE |
| 6 | SUBSCRIBER DATA | SDCS | LDAP | This interface is optional and allows the CE to query subscriber context data to be able to enforce subscriber level policies. |
| 7 | SYSTEM MANAGEMENT | CE | SNMP | This interface allows network management systems to configure/manage the CE. As well as provides a way to collect the following information from the CE:<br>- Alarms/Faults<br>- Measurements<br>- Status |

FIG. 13

| API ON-BOARDING | API POLICY AND BUSINESS MODEL MANAGEMENT | API STATUS |
|---|---|---|
| • ENABLE AND DISABLE APIs<br>• GATHER AND PROPAGATE API METADATA<br>• GATHER API TECHNICAL DETAILS<br>• VERSION APIs AND DEPLOY TO EXPOSURE ENGINES | • CREATE AND MODIFY API USAGE POLICIES<br>• CREATE AND MODIFY API BUSINESS MODELS<br>• ASSIGN POLICIES AND BUSINESS MODELS TO APIs<br>• ENABLE AND DISABLE SPECIFIC APPLICATION KEYS PER API<br>• ASSIGN APIs TO BUNDLES | • API PERFORMANCE METRICS<br>• VIEW APPLICATION DEPENDENCIES<br>• VIEW DEPLOYED VERSIONS AND EXPOSURE ENGINE NODES |

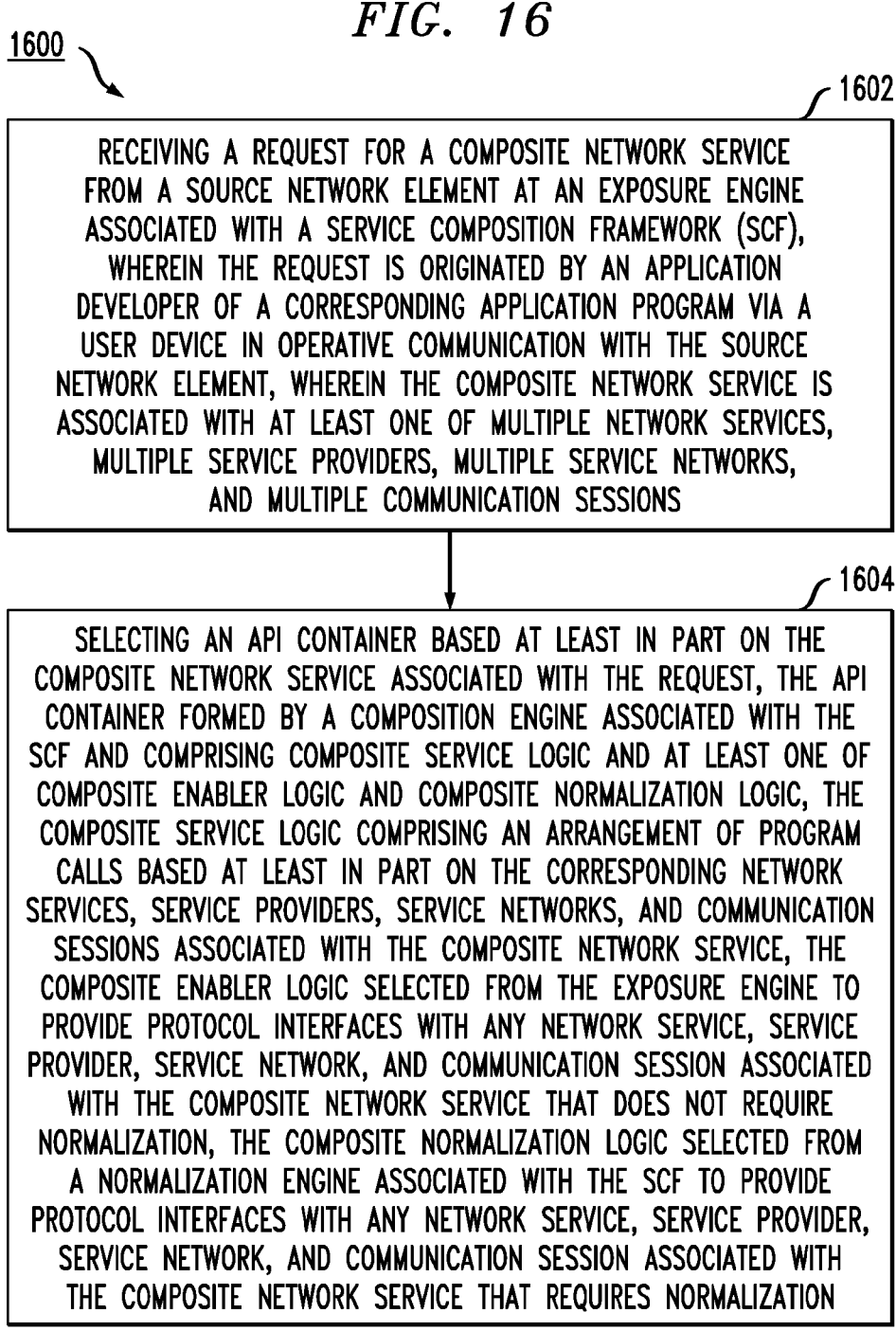

METHOD AND APPARATUS FOR PROVIDING APPLICATION WITH INTERFACE TO COMPOSITE NETWORK SERVICE

BACKGROUND

This disclosure relates to a technique for providing an application with an interface to a composite network service. A composite network service can use any combination of multiple network services, multiple service providers, multiple service networks, and multiple communication sessions. An application requesting a composite network service may be offered by a service provider, a network operator, or a third-party partner. For example, the interface may be provided as a service using an application enablement suite. This disclosure describes exemplary embodiments that provide a web-based application with an interface that includes an application program interface (API) container associated with a service composition framework (SCF). The API container provides the interface to the desired composite network service. An exemplary API container may include composite service logic and composite enabler logic, composite normalization logic, or both composite enabler logic and composite normalization logic. A localized weather forecast is discloses as an exemplary composite network service. However, various embodiments of the methods and apparatus described herein may be used in conjunction with providing any type of network application with an interface to any type of composite network service.

The Parlay framework is meant to be able to map native interface specifications of solo applications, such as a short messaging service (SMS) application or a location application, etc., to respective Parlay-based specifications. Parlay is about mapping the interface protocol for the same service, like mapping the native interface of SMS with a corresponding Parlay/representational state transfer (REST) for SMS or mapping the native interface of location with a corresponding Parlay/REST for location. In other words, Parlay doesn't combine SMS with location or location with privacy or XDMS with location or PIM with location and so on. Parlay just maps the static parameters for an API of a single service.

The Application Exposure Suite (AES) is a product offered by Alcatel-Lucent of Paris, France that is an end-to-end solution which provides network operators with the ability to expose APIs to both external third-party and internal applications in a secure and controlled manner. A service composition framework (SCF) is an element within the AES. The SCF provides an extensible framework for creating new composite/orchestrated web service APIs.

For these and other reasons, there is a need to provide a solution to providing an application with an interface to a composite network service that is robust, scalable, and expandable to dynamically accommodate requests for composite network services that combine diverse services across various types of networks using a variety of technological solutions.

SUMMARY

In one aspect, a method of providing an application with an interface to a composite network service is provided. In one embodiment, the method includes: a) receiving a request for a composite network service from a source network element at an exposure engine associated with a service composition framework (SCF), wherein the request is originated by a subscriber to the composite network service activating an application program for the composite network service via a user device in operative communication with the source network element, wherein the composite network service is associated with at least one of multiple network services, multiple service providers, multiple service networks, and multiple communication sessions; and b) selecting an API container based at least in part on the composite network service associated with the request, the API container formed by a composition engine associated with the SCF and comprising composite service logic and at least one of composite enabler logic and composite normalization logic, the composite service logic comprising an arrangement of program calls based at least in part on the corresponding network services, service providers, service networks, and communication sessions associated with the composite network service, the composite enabler logic selected from the exposure engine to provide protocol interfaces with any network service, service provider, service network, and communication session associated with the composite network service that does not require normalization, the composite normalization logic selected from a normalization engine associated with the SCF to provide protocol interfaces with any network service, service provider, service network, and communication session associated with the composite network service that requires normalization.

In another aspect, an apparatus for providing an application with an interface to a composite network service is provided. In one embodiment, the apparatus includes: an exposure engine associated with a service composition framework (SCF) for receiving a request for a composite network service from a source network element, wherein the request is originated by a subscriber to the composite network service activating an application program for the composite network service via a user device in operative communication with the source network element, wherein the composite network service is associated with at least one of multiple network services, multiple service providers, multiple service networks, and multiple communication sessions; and an API container selected by the exposure engine based at least in part on the composite network service associated with the request. The API container formed by a composition engine associated with the SCF and comprising: composite service logic comprising an arrangement of program calls based at least in part on the corresponding network services, service providers, service networks, and communication sessions associated with the composite network service; and at least one of composite enabler logic and composite normalization logic, the composite enabler logic selected from the exposure engine to provide protocol interfaces with any network service, service provider, service network, and communication session associated with the composite network service that does not require normalization, the composite normalization logic selected from a normalization engine associated with the SCF to provide protocol interfaces with any network service, service provider, service network, and communication session associated with the composite network service that requires normalization.

In yet another aspect, another method of providing an application with an interface to a composite network service is provided. In one embodiment, the method includes: a) receiving a request for a composite network service from a source network element at an exposure engine associated with a service composition framework (SCF), wherein the request is originated by an application developer of a corresponding application program via a user device in operative communication with the source network element, wherein the composite network service is associated with at least one of multiple network services, multiple service providers, multiple service networks, and multiple communication sessions; and b) selecting an API container based at least in part on the composite network service associated with the request, the API container formed by a composition engine associated with the SCF and comprising composite service logic and at least one of composite enabler logic and composite normalization logic, the composite service logic comprising an arrangement of program calls based at least in part on the corresponding network services, service providers, service networks, and communication sessions associated with the composite network service, the composite enabler logic selected from the exposure engine to provide protocol interfaces with any network service, service provider, service network, and communication session associated with the composite network service that does not require normalization, the composite normalization logic selected from a normalization engine associated with the SCF to provide protocol interfaces with any network service, service provider, service network, and communication session associated with the composite network service that requires normalization.

Further scope of the applicability of the present invention will become apparent from the detailed description provided below. It should be understood, however, that the detailed description and specific examples, while indicating preferred embodiments of the invention, are given by way of illustration only, since various changes and modifications within the spirit and scope of the invention will become apparent to those skilled in the art.

DESCRIPTION OF THE DRAWINGS

The present invention exists in the construction, arrangement, and combination of the various parts of the device, and steps of the method, whereby the objects contemplated are attained as hereinafter more fully set forth, specifically pointed out in the claims, and illustrated in the accompanying drawings in which:

FIG. 12 is a table showing examples of interfaces exposed to subscribers and composite network services by an exemplary embodiment of a composition engine of an SCF;

FIG. 13 is a chart showing examples of features provided to subscribers and composite network services by an exemplary embodiment of a composition engine of an SCF;

FIG. 16 is a flow chart of yet another exemplary embodiment of a process for providing an application with an interface to a composite network service.

DETAILED DESCRIPTION

Figure 1:
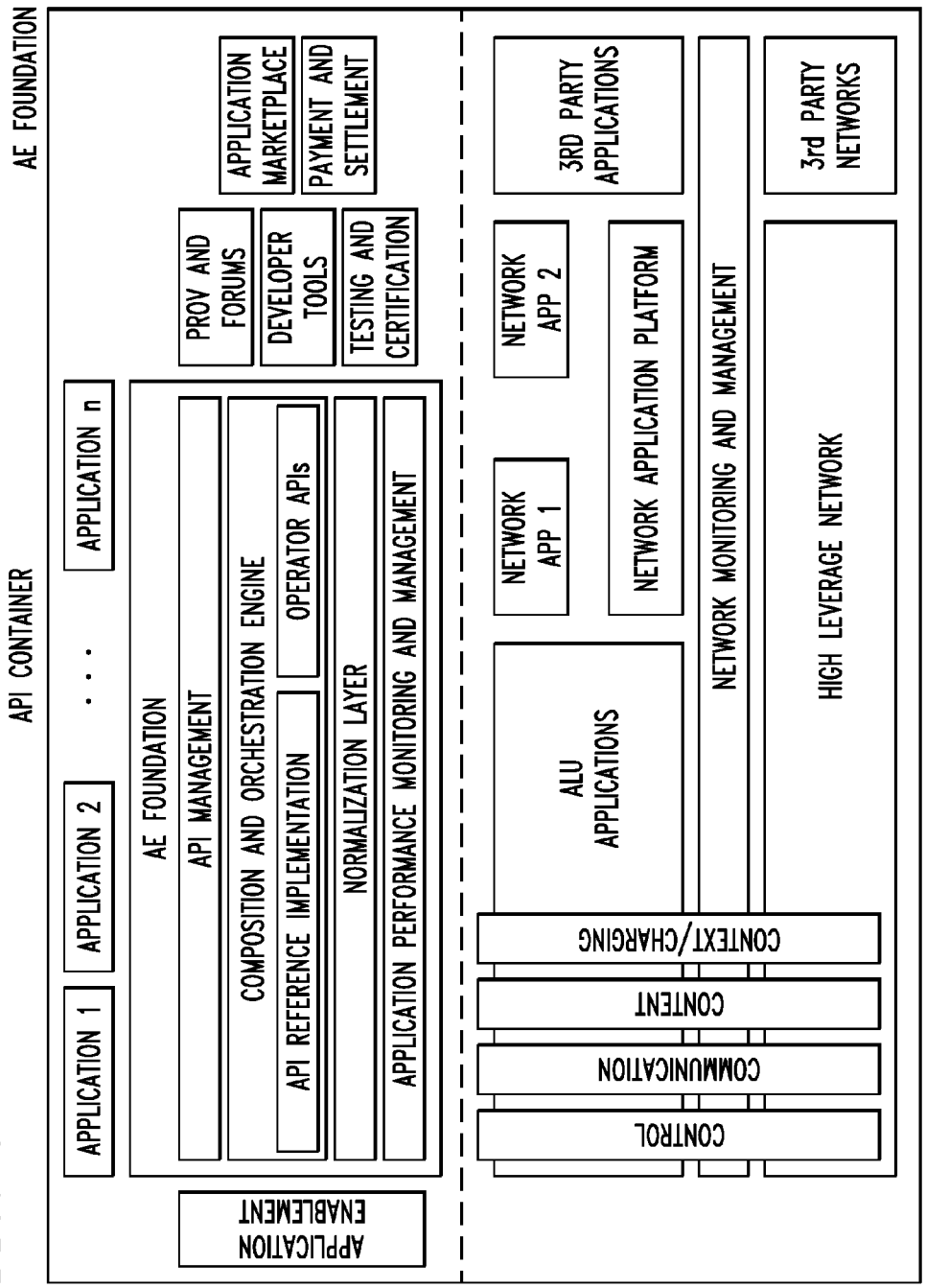
FIG. 1 is a block diagram of an exemplary embodiment of a system for providing an application with an interface to a composite network service.

Various embodiments of methods and apparatus provide an application with an interface to a composite network service. In certain embodiments, the application is a web-based application. However, in other embodiment, the application may be any type of network application. In certain embodiments, the interface is provided by an application enablement suite (AES) with a service composition framework (SCF) that includes an exposure engine and an application program interface (API) container that matches up to a request from the application for the composite network service. However, in other embodiments, any arrangement of composite service logic and composite enabler logic, composite normalization logic, or both composite enabler logic and composite normalization logic in a suitable architecture can provide the interface. In one embodiment, the composite network service includes a localized weather service that is a composite of a location service, a weather service, and a message delivery service. However, in other embodiments, the composite network service can be any combination of multiple network services, multiple service providers, multiple service networks, and multiple communication sessions.

This disclosure provides a modular API container service infrastructure and SCF engine-based platform to compose, orchestrate, mash up, expose and instantiate the composite APIs, enablers and applications so that a multitude of complex web services can be developed for different vertical industries, such as telecom, automotive, finance, insurance, medical, space, social, education, etc., by writing a few of lines of technical/business logic on a graphical framework. The embodiments disclosed herein are different from the Parlay framework because Parlay is not about composite applications, enablers, campaigns, or services that mash up multiple applications in an orchestrated manner across different industries, segments, or markets. Parlay does not change APIs dynamically using policies that can respond to changes in dynamic parameters.

On the other hand, this disclosure mentions "composition" in the acronym "SCF" which essentially means tying up composite (e.g., mash-ups, orchestrations, exposure, etc. engines) applications and sessions which are sequenced and mixed and matched one after another (e.g., bundling together applications, such as SMS, location, XDMS, PIM, privacy, etc.) to derive multi-contextual meta-data logic. Thus, it enables the automation for dynamically creating web services graphically, leveraging the rich and diverse enabler features offered by the framework for complex and blended user scenarios that involves multitude of layers across different industry segments and mash up the sessions to orchestrate them to fulfill any type of business or technical logic.

In this disclosure, a northbound call is mapped to a composition of multiple southbound calls and vice versa with potentially complex coordination of computation. Northbound and southbound are used here as symbolic references to different types of networks. Otherwise, northbound and southbound have no special meaning. For example, northbound and southbound could be used in reverse order without changing the symbolic meaning being denoted by the terms.

Back to the example, a composition or orchestration process is invoked to manage the transactional nature of the sequences of multiple composite calls by primarily using complex/dynamic transformations of the parameters to implement the mappings. The composition and orchestration engine also records appropriate data for tracking the calls for various purposes including policy enforcement, security and billing. It accesses the appropriate data to authenticate and authorize the application, applies the necessary policy validation, maps the request to the appropriate enabler's specific request, and routes the "southbound" call to the enabler's resource. Using the flexible access to the underlying services, the enabler's response is mapped and routed back to the calling application while protecting the backend infrastructure from misuse and attacks. This process involves going out to a series of network nodes and uses a set of bundles across the internal and external nodes based upon dynamic policy updates.

This disclosure defines the engines, components, flexible API access management functions (e.g., dynamically changing the behavior of the APIs without having to change the logic) and different network layer capabilities that provide unified, centralized, secure and enabler independent runtime interface into network provider assets. The SCF engine of the API container dynamically mixes and matches the sequence of sending the automatic notifications related to underlying services, enablers, mash-up applications and policies across development partners, enterprises, applications, campaigns and end-user subscribers while protecting the backend infrastructure from misuse and attacks. The engine also has the capability to dynamically allocate or de-allocate the IP addresses inside runtime component and several other places based upon whether a database instance is added or taken down respectively. Such implementation engine has mature access paths to states, is usually long running and have complex concurrent and synchronization points among multiple enabler calls. This implementation also has the capability of invoking dynamic routing, complex transformation and mediation of message, enablers, services, OSS/BSS capabilities etc for complex mappings of parameters.

Following types of bundles are examples of SCF based upon the following: i) APIs (e.g., groups, lounges, and masheries) and enablers; ii) APIs and services; iii) services and enablers; iv) enablers and applications; and v) applications and services.

This disclosure further provides techniques by providing dynamic composite APIs, correlation of context/business logic with service modules, automatic code-generation and cross-carrier aggregation to help app developers and API providers to extend the reach of their application to subscribers of many service providers and thereby monetize their mash-ups, bundles & richer sets of apps, services, enablers, etc.

Automatic Resource and Policy Management:

It provides capabilities for the service provider to manage SLAs for them and for their partner resources. This includes capabilities to create, update and delete SLAs and policies in an automatic and dynamic fashion. SLA management includes functions to report on SLA thresholds and usage, such as transactions per second and time of day policies.

This solution enforces various policies that govern the run-time behavior of the API, service, composition, and orchestration components and the APIs/services that are processed. A policy is expressed as one or more rules, and these rules are stored in the appropriate rules database within the provisioning repository. These policies can also be distributed to the API exposure component, as well as the normalization component, to allow for optimal policy enforcement model. These policies are used for the following purposes: i) auto-protection of the enablers from overloading, ii) auto-protection of the enablers from unauthorized access to the AES and its APIs, i.e., authentication, authorization, etc. based policies, iii) automatically ensuring that the applications are using the APIs based on agreements, i.e., TPS, quota, time of day, day of week limitations, iv) auto-ensuring end users are using the applications appropriately, i.e., end user is a valid users who is not blacklisted for the application, end user has an appropriate payment plan for the application, end user has appropriate permissions to access private information, etc., v) auto-ensuring the appropriate messages are sent to and received from enablers based upon the application using them, and vi) ensuring the right addresses are used when using the APIs.

This disclosure provides a service architecture and engine components in the service composition framework (SCF) API container in supporting application enabler services. The architecture proposes two major logic layers for service: i) a service layer and ii) an enabler layer. The service layer defines how the service is to be exposed to applications and is the primary layer which integrates with the AES service (e.g., policy, EDR/CDR, etc.). The enabler layer includes logic responsible for integrating and using enabler functionality in a service layer (i.e., composite API) and, depending on the depth of the layer, responsible for normalization of the enabler from a native protocol. Applications that are exposed will be accessible through URL and credentials will be passed in the URL string.

Figure 2:
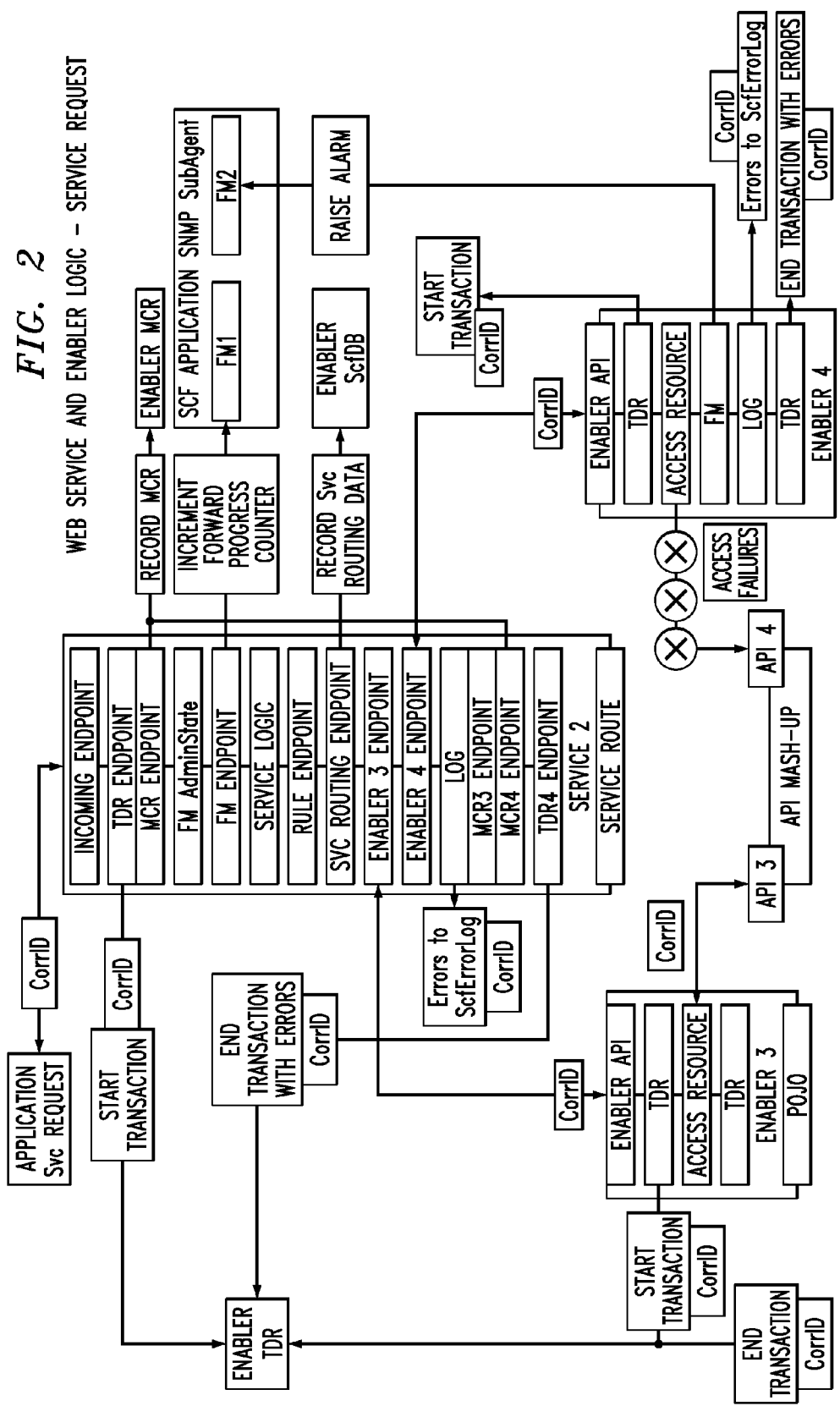
FIG. 2 is a block diagram of an exemplary embodiment of a system for providing a web-based application with an interface to a composite network service.
Figure 3:
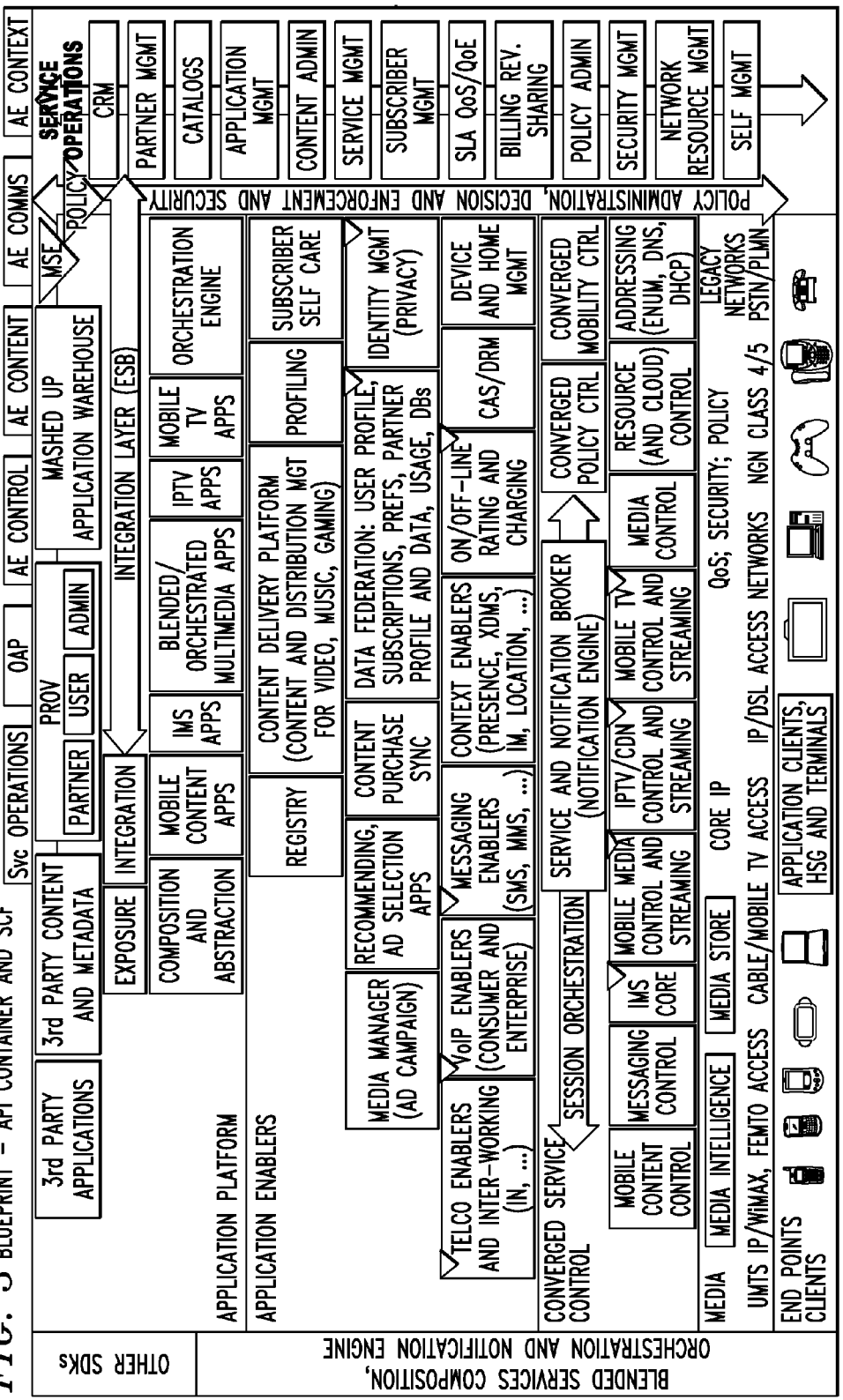
FIG. 3 is a block diagram of another exemplary embodiment of a system for providing an application with an interface to a composite network service.

With reference to FIG. 1, a block diagram shows an exemplary embodiment of a system for providing an application with an interface to a composite network service. FIG. 2 shows a block diagram of an exemplary embodiment of a system for providing a web-based application with an interface to a composite network service. FIG. 3 shows a block diagram of another exemplary embodiment of a system for providing an application with an interface to a composite network service.

SCF Overview

The SCF provides a robust, scalable, and flexible platform for creating new composite services quickly leveraging enterprise server (ES) technology. The SCF is based on an API container which provides modularity in adding new service modules as required without introducing negative impacts on existing services and modules.

Key benefits of the SCF are: i) the SCF is using a highly used ES as its base; ii) the ES is a robust infrastructure that supports flexible and modular deployment configurations ranging from embedded, Java EE, and standalone API containers; iii) the ES provides a flexible and pluggable architecture that allows organizations to use their preferred API composition solutions in the AES Suite. The JBI- or API-compliant service engines can be deployed to the ES's container, and ES components may be deployed to other ESs. The binding component pattern allows making service accessible through multiple transport protocols; iv) flexible API exposure technologies like representational transfer (REST), simple object access protocol (SOAP), Java messaging service (JMS), etc. can be supported; v) flexible composite capabilities and languages enabling web services interactions for executable and abstract business processes; vi) easy management and deployment of new composite APIs; vii) integration openness and flexibility; viii) performance and scalability (existing deployment of core ES supporting billions of transaction per day); ix) technology maturity (i.e., core ES deployed at many customers in top Fortune 500 companies); x) promotes reuse and modularity of components created in the platform.

Figure 4:
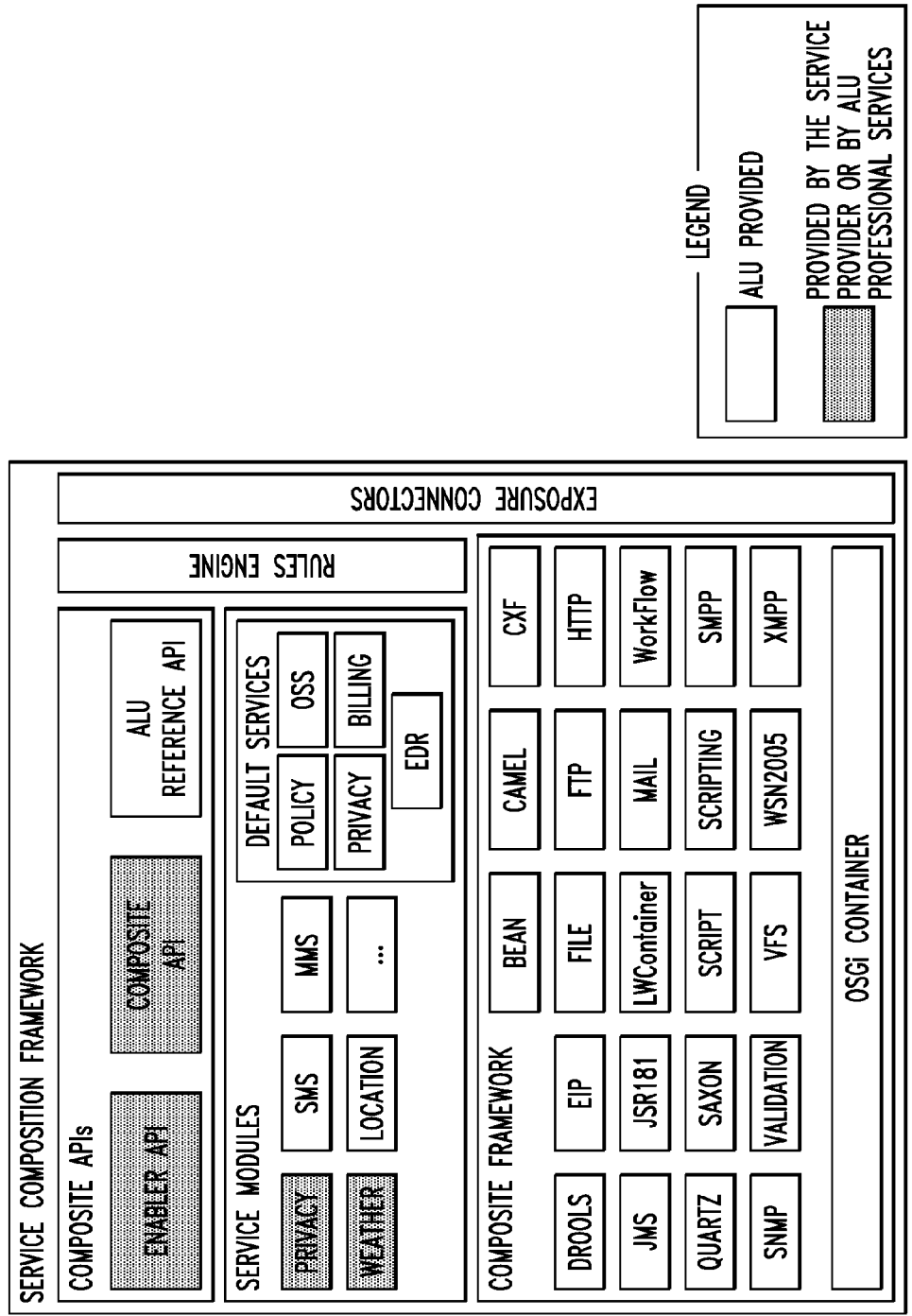
FIG. 4 is a block diagram of an exemplary embodiment of a service composition framework (SCF) with an application program interface (API) container that provides an application with an interface to a composite network service.

With reference to FIG. 4, a block diagram provides an exemplary architecture for an SCF with an API container that provides an application with an interface to a composite network service. The base composite framework includes modules for common capabilities, such as file access, SNMP, Scripting, etc. Service modules reside on top of the base framework and provide reusable components that perform base tasks on which composite services can be built on. Default service modules provide core components to integrate services into the overall AES solution such as policy, billing, EDRs, etc. In addition, the SCF service provider can provide service modules for common types of services, such as SMS, MMS, location, etc. New service modules can be added to the SCF as required for specific network operator environments (e.g., new enablers, access to third-party systems, etc.). These new service modules may be created by the network operator and their partners directly or may be created as a professional service for the network operator by the SCF service provider.

Composite APIs/services are created using the service creation environment (as shown in the SCCE and development environment of related figures below). These composite APIs leverage the exposure connectors to connect the specific service logic with the service modules provided by the SCF. Like the service modules, the SCF service provider can provide some reference APIs and new APIs/services may be added by the network operator and their partners directly or as a professional service for the network operator by the SCF service provider.

The SCF API Container Architecture

Figure 5:
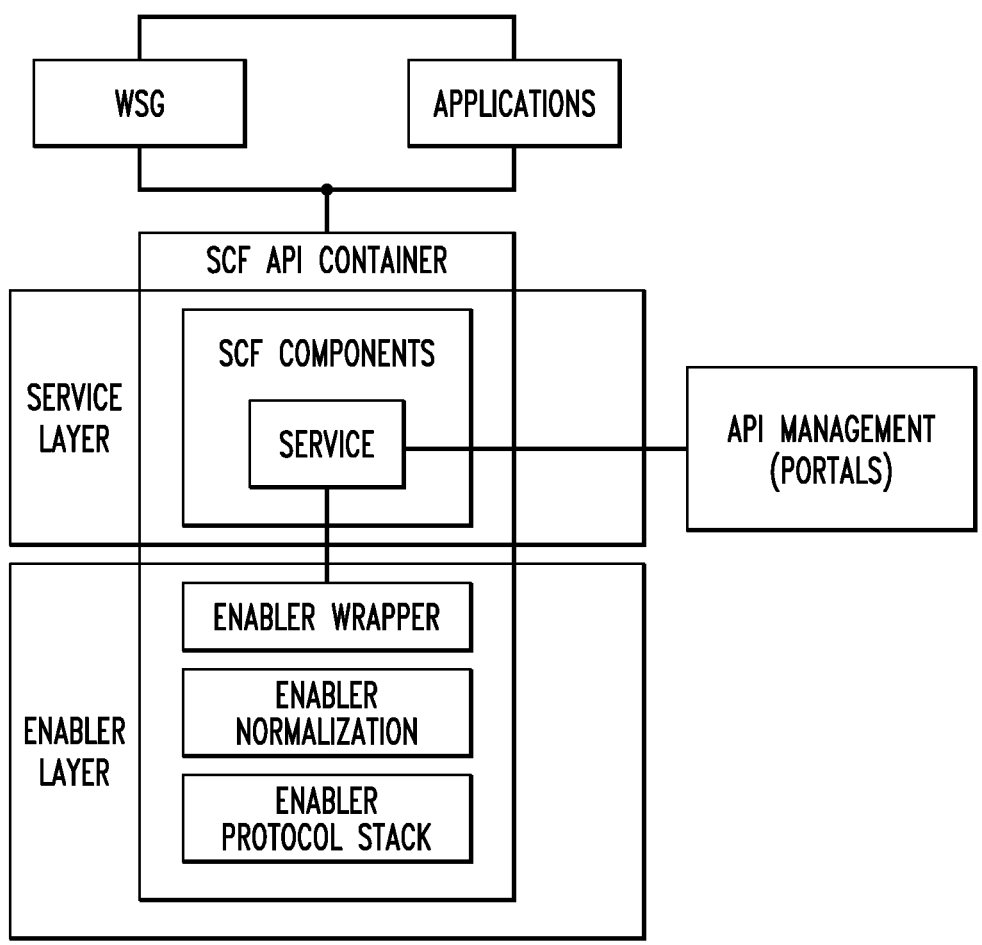
FIG. 5 is a block diagram of another exemplary embodiment of an SCF with an API container that provides an application with an interface to a composite network service.

With reference to FIG. 5, a block diagram provides another exemplary architecture of an SCF with an API container that provides an application with an interface to a composite network service. There are two major logic layers for service, a service layer and an enabler layer. Each of these layers and their sub-layers will be an API bundle. Depending on where the service needs to be deployed (i.e., what types of platforms), the layers will be dependent or independent of the platform.

The service layer defines how the service is to be exposed to applications and is the primary layer which integrates with the AES service (policy, EDR/CDR, etc.). The service layer logic will do the following functions and is build using a composite language (for orchestration logic, etc.): i) define and expose the appropriate API/service (REST, SOAP, JMS); ii) if necessary, provide the necessary composite logic to use multiple enablers for the service (this is not necessary if the enabler is being directly exposed from SCF); iii) apply the appropriate policy (i.e., AES general, API/service specific, etc.); and iv) integration with the AES and service provider OSS/BSS functionality (e.g., EDR/CDR, measurements, alarms, provisioning, etc.).

The enabler layer logic is responsible for making it easy to integrate and use an enabler's functionality in a service layer (e.g., composite API) and depending on the depth layer provide the normalization of the enabler from native protocol. The enabler layer is composited with several sub-layers.

The enabler wrapper sub-layer logic is responsible for making it easy to integrate and use enabler functionality in service logic (i.e., composite API). It masks the complexities of using generic HTTP request (e.g., SOAP or REST) to perform a given function. For example, spring Java beans may be used because they are easily used by orchestration logic and composition engines. This sub-layer provides the following functions: i) provide the necessary Java bean interfaces, ii) provide the logic to integrate with the communication protocol (e.g., HTTP based—SOAP or REST) and control the connection to the enabler system, and iii) some integration with the AES and service provider OSS/BSS and policy functionality (when it cannot be avoided).

The enabler normalization sub-layer logic is responsible for normalizing the enabler specific protocol into a protocol that is easily used by the different components of the AES solution. This could be merged with the composite friendly wrapper. The enabler normalization is built because there is no need to use the normalization implementations outside of AES. Even if there were a need to use them outside of AES, the actual service APIs could be exposed from Service Layer for this purpose. This sub-layer can be dependent or independent of the platform. This is usually dependent on the complexity of the native protocol and the amount of state information that must be maintained in order to normalize it. In addition to normalization logic, this sub-layer also provides the following functions: i) apply the appropriate normalization policy (e.g., southbound throttling, etc.) and ii) integration with the AES and service provider OSS/BSS functionality (e.g., EDR/CDR, Measurements, Alarms, Provisioning, etc.).

The enabler protocol stack sub-layer is a specific communication and protocol stack implementation used to communicate with the network element which is providing the enabler functionality. Even if the protocol stack is independent of a platform, it is still tested on the SCF platform to make sure it works with other components.

SCF Composition Engine

The SCF composition engine can be use to extend beyond composition or orchestration, to connect into a service provider's OSS/BSS capabilities, as this engine uses the same type of integration technology (ES) and API workflow logic engines as used in platforms for operational and business process execution, e.g. for managing provisioning, billing, access control and on-boarding.

Figure 6:
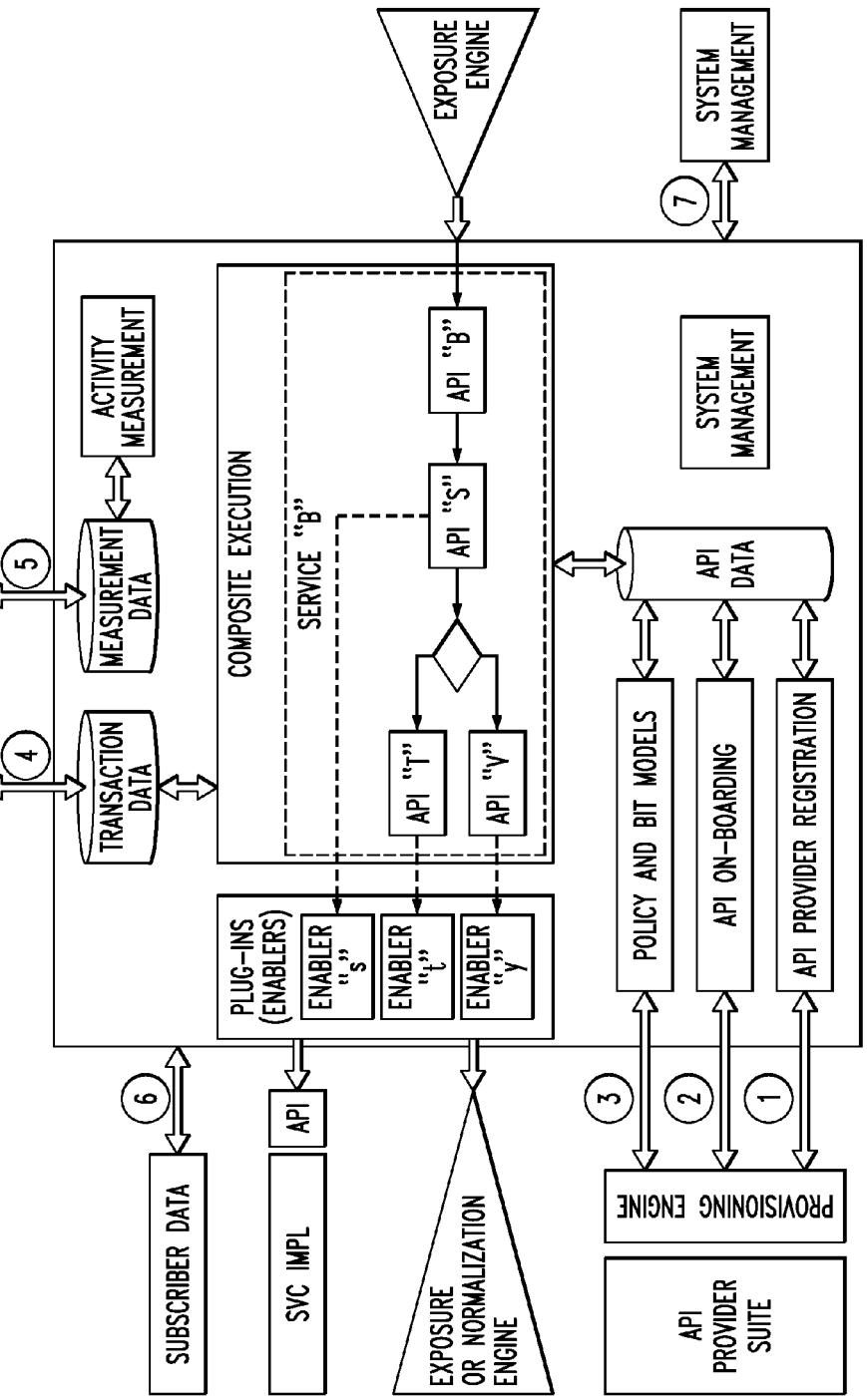
FIG. 6 is a block diagram of yet another exemplary embodiment of an SCF with an API container that provides an application with an interface to a composite network service.

With reference to FIG. 6, a block diagram provides an exemplary embodiment of an SCF with an API container that provides an application with an interface to a composite network service. The exemplary SCF includes a composition engine. The following are the composite and orchestration technologies that can be used with SCF composition engine to create composite and orchestration services/APIs: i) transformational composite language, ii) stateful composite language, and iii) business process composite language.

The transformational composite language is light-weight, flexible, and easy to use. This composition language is used for composite services with the following characteristics: i) complex transformation and message mediation, ii) minimal API state management (but could be used with more complex state management), iii) web services to other web services interfaces, and iv) composite services that will be reused to create new composite services.

The stateful composite language uses Java to develop the composite services. This composition language is used for composite services with the following characteristics: i) complex stateful composite services, ii) composite services that do not plan to change that much once developed, iii) composite services that must interface with enablers or other third-party systems that do not have a web services oriented interface, and iv) high volume composite services.

The business process composite language is used to build business process oriented compositions. This composition language is used for composite services with the following characteristics: i) stateful and long running composite services and ii) composite services that must interface primarily with web services oriented third-party systems.

The logical architecture of an API includes: i) service modules and ii) enabler modules. The service modules are the specific composite services (aka service mashups or orchestrated services) which allow the network operator to expose new APIs which build off of existing APIs and/or network enablers. These service modules are created using the API provider suite tools. These service modules leverage the appropriate orchestration engine to connect the specific service composite logic with the enabler modules provided by the SCF. The enabler modules are provided with the SCF to provide access to core capabilities that may be reused to build composite/custom service APIs. Enable modules vary in complexity depending on the complexity of the implementation. Some enabler modules are simply REST or SOAP Java stubs/proxies. Other enabler modules may use Java components to provide the complete functionality. The enabler modules will be accessible from any composition language.

The SCF API Container Model

Figure 7:
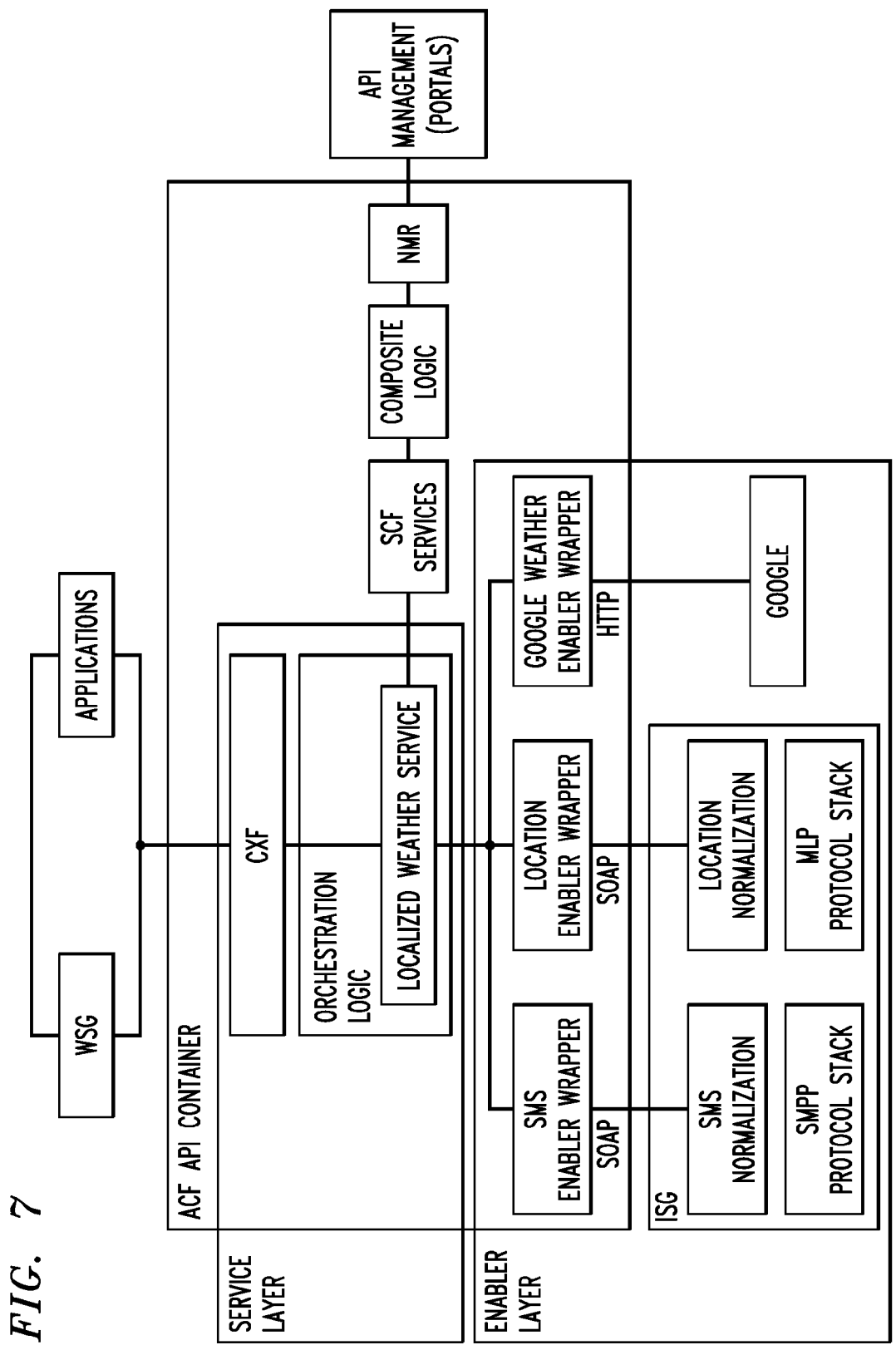
FIG. 7 is a block diagram of an exemplary embodiment of an SCF with an API container that provides a localized weather service application with an interface to a composite localized weather service.
Figure 8:
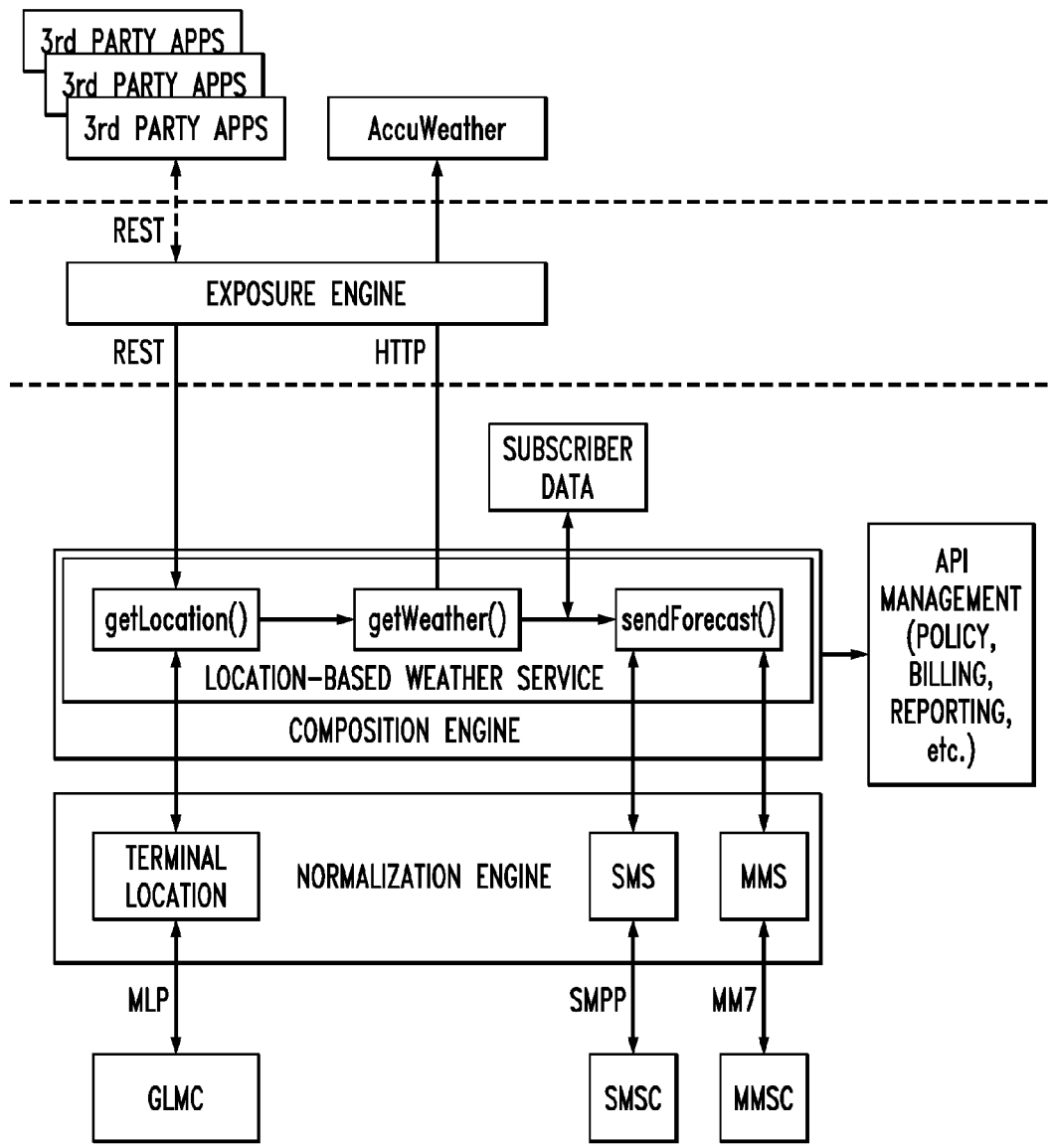
FIG. 8 is a block diagram of another exemplary embodiment of an SCF with an API container that provides a localized weather service application with an interface to a composite localized weather service.

With reference to FIG. 7, the block diagram shows an exemplary embodiment of an SCF with an API container that provides a localized weather service application with an interface to a composite localized weather service. FIG. 8 is a block diagram that shows another exemplary embodiment of an SCF with an API container that provides a localized weather service application with an interface to a composite localized weather service. These examples show how a composite service fits into the overall AES solution. The exposure layer (e.g., WSG) will expose the security and access control to the API(s) that are exposed from the composite service. The composite service utilizes existing service modules for common capabilities (e.g., location, SMS) and a new localized weather service module is added in a manner that can be utilized for future requests for composite service.

In this example, the location based weather composite service exposes SOAP APIs called getLocationBasedCurrentConditions and getLocationBasedForecast with the MSISDN being an input parameter. The composite service takes the MSISDN and calls the getLocation API exposed from ISG. The getLocation result provides the latitude/longitude coordinates of the MSISDN. The composite service takes the latitude/longitude coordinates and determines the ZIP code of the user's current location. Next, the composite service invokes the weather API exposed by AccuWeather.com which returns weather conditions/forecast. The composite service finally uses the SMS API exposed from Internet services gateway (ISG) to deliver a representation of the weather.

It should be noted that this example shows a very simple use case to demonstrate the concepts of the SCF. For example, the location based weather composite service may include additional logic such as determining the user's device type to decide to send a multimedia message service (MMS) message with graphic weather instead of an SMS message. Similarly, the composite service may insert some advertising content to provide supplement revenue streams, etc.

Figure 9:
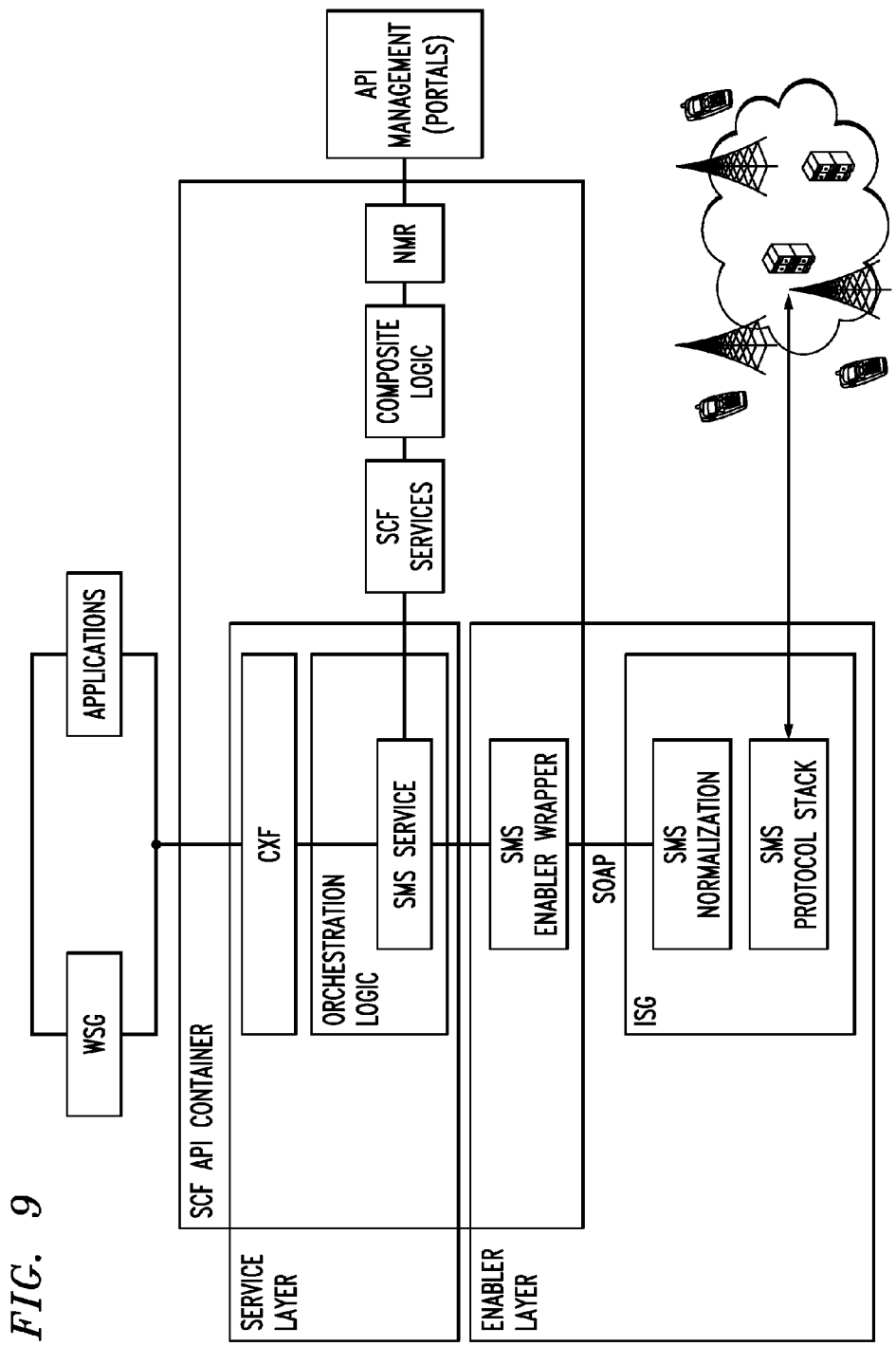
FIG. 9 is a block diagram of an exemplary embodiment of an SCF with an API container that provides a third-party short message service (SMS) service application associated with an origination subscriber with an interface to another SMS service associated with a destination subscriber.
Figure 10:
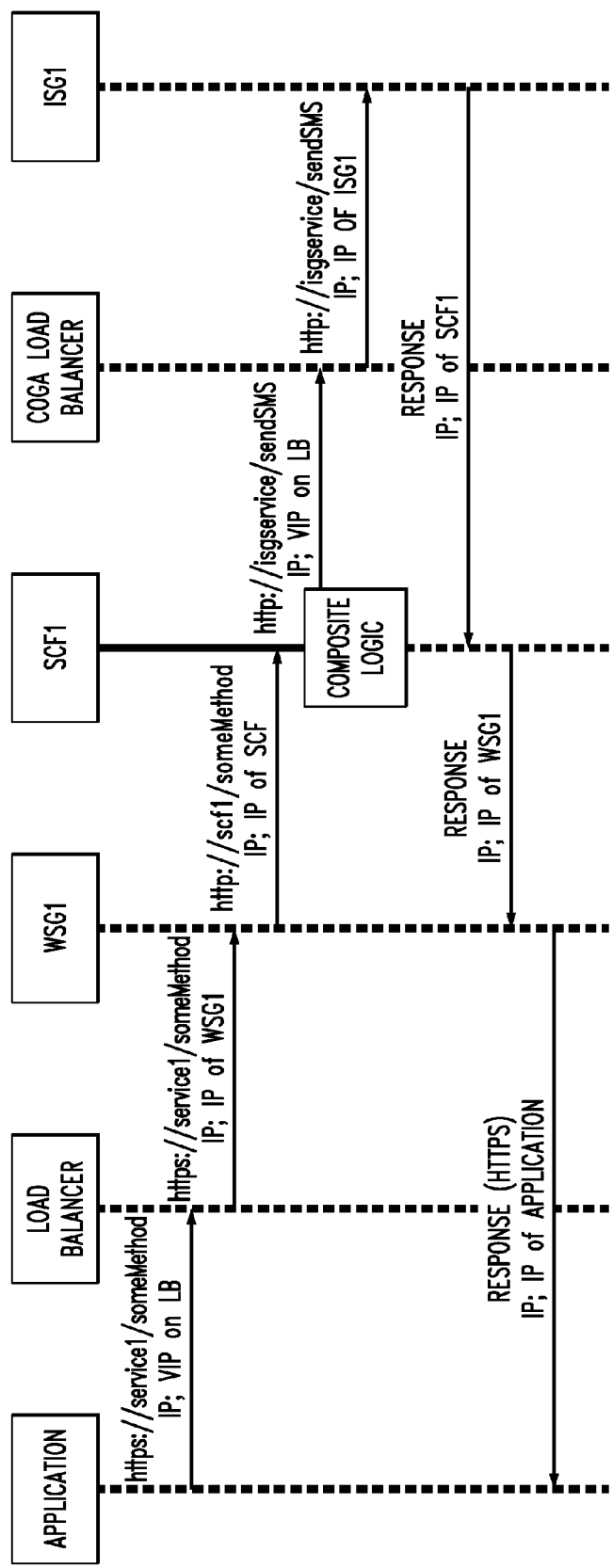
FIG. 10 is a call flow diagram for providing a web-based SMS message to a mobile subscriber for enhanced caller identification (ID) service using an exemplary embodiment of a system that provides the web-based SMS application with an interface to provide the corresponding composite network service.

With reference to FIG. 9, a block diagram shows an exemplary embodiment of an SCF with an API container that provides a third-party short message service (SMS) service application associated with an origination subscriber with an interface to another SMS service associated with a destination subscriber. Note that the composite service is SMS service from a third-party application to and from telecommunication networks. FIG. 10 shows a call flow diagram for providing a web-based SMS message to a mobile subscriber for enhanced caller identification (ID) service using an exemplary embodiment of a system that provides the web-based SMS application with an interface to provide the corresponding composite network service.

Provisioning Example

Figure 11:
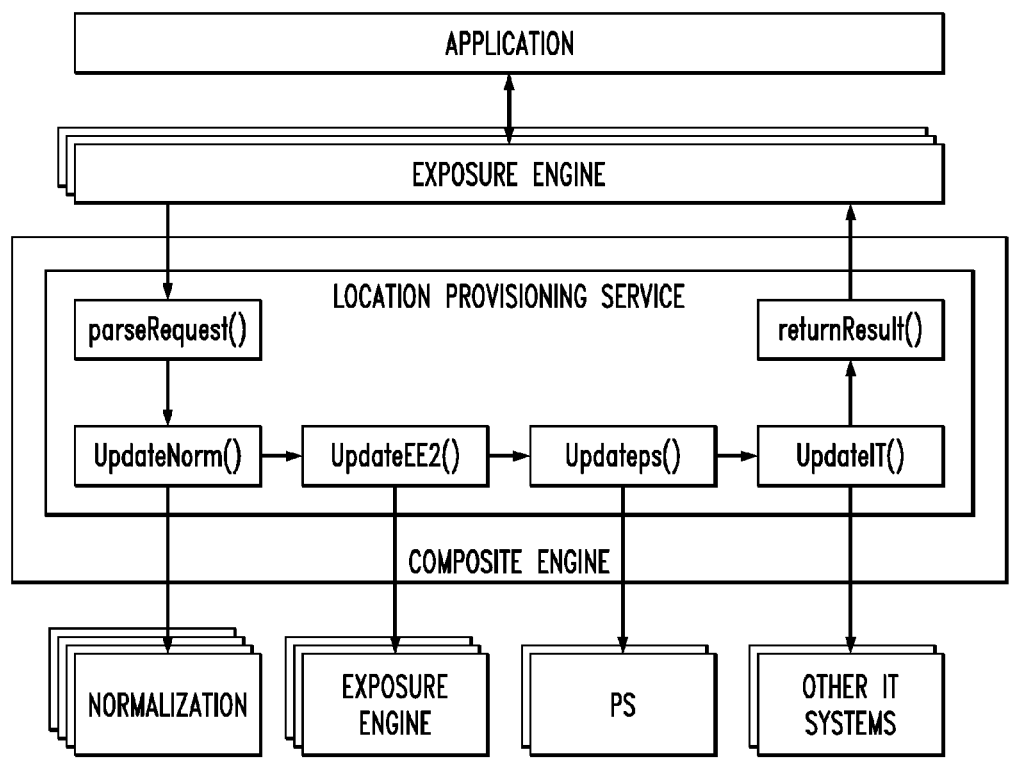
FIG. 11 is a block diagram of still another exemplary embodiment of an SCF with an API container that provides an application with an interface to a composite network service.

With reference to FIG. 11, a block diagram shows still another exemplary embodiment of an SCF with an API container that provides an application with an interface to a composite network service. This is a logical view of a provisioning example of a composite service called location provisioning service. This example shows how a provisioning based composite service fits into the overall OAP solution. The exposure engine will expose the security and access control to the API(s) that are exposed from the composite service. The composite service utilizes existing provisioning enabler modules for common capabilities (e.g., normalization, exposure engine) and new enabler modules may also be added for services (e.g., privacy server (PS) that is not pre-existing in the API container) in a manner that can be utilized by future composite services.

In this example, the location provision composite service exposes new APIs called setPrivacyLocationData with the MSISDN of the location data being requested being an input parameter. The following is the flow: i) location provisioning service receives a request to add a third-party application for access to location for a specific subscriber, ii) the normalization engine is called to add the application so that it can access the location data for a given subscriber, iii) the exposure engine is called to add the application so that it can use the location service, iv) the third-party privacy server (PS) is called to add the application and any necessary privacy rules, and v) additional IT systems can be called to provide the appropriate data. A result is returned to the requesting application to indicate if the operation was successful. If an error is encountered at any step, the location provisioning service will roll back any changes and notify the external application of the failure.

APIs Interfaces Exposure:

With reference to FIG. 12, a table showing shows examples of interfaces exposed to subscribers and composite network services by an exemplary embodiment of a composition engine of an SCF.

In summary, this disclosure provides various embodiments of methods and apparatus that create an architecture and functionality in the SCF for supporting the application enabler. The SCF's composition engine provides the framework to create or extend services/APIs to provider complex functionality across different enablers and OSS/BSS capabilities. This includes a mapping the northbound application interface calls to southbound enabler interface calls and vice versa. This engine can support a broad range of service/API creation as well as provide the API container capabilities for policy, on-boarding, status, etc. FIG. 13 is a chart showing examples of features provided to subscribers and composite network services by an exemplary embodiment of a composition engine of an SCF.

All API provisioning information is stored in a central database and used across the platform. Select information may be shared with a developer portal, business suite, API exposure suite and application developer suite. The SCF capability described herein can also be used for other application enabler services.

The embodiments described herein are light-weight and highly scalable implementations of a service/API having unlimited access paths to state. It can handle various sequences of multiple enabler calls and primarily use straight forward transformations of the parameters to implement the mappings. This provides a simpler configuration and faster method to implement web services by defining services in application contexts. There is potential for using a multitude of transports to consume web services based on message payloads received from their processing as a RESTful or SOAP web service. This supports long running, complex concurrent and synchronization points among multiple enabler calls. These implementations also support very complex mappings of parameters.

Figure 14:
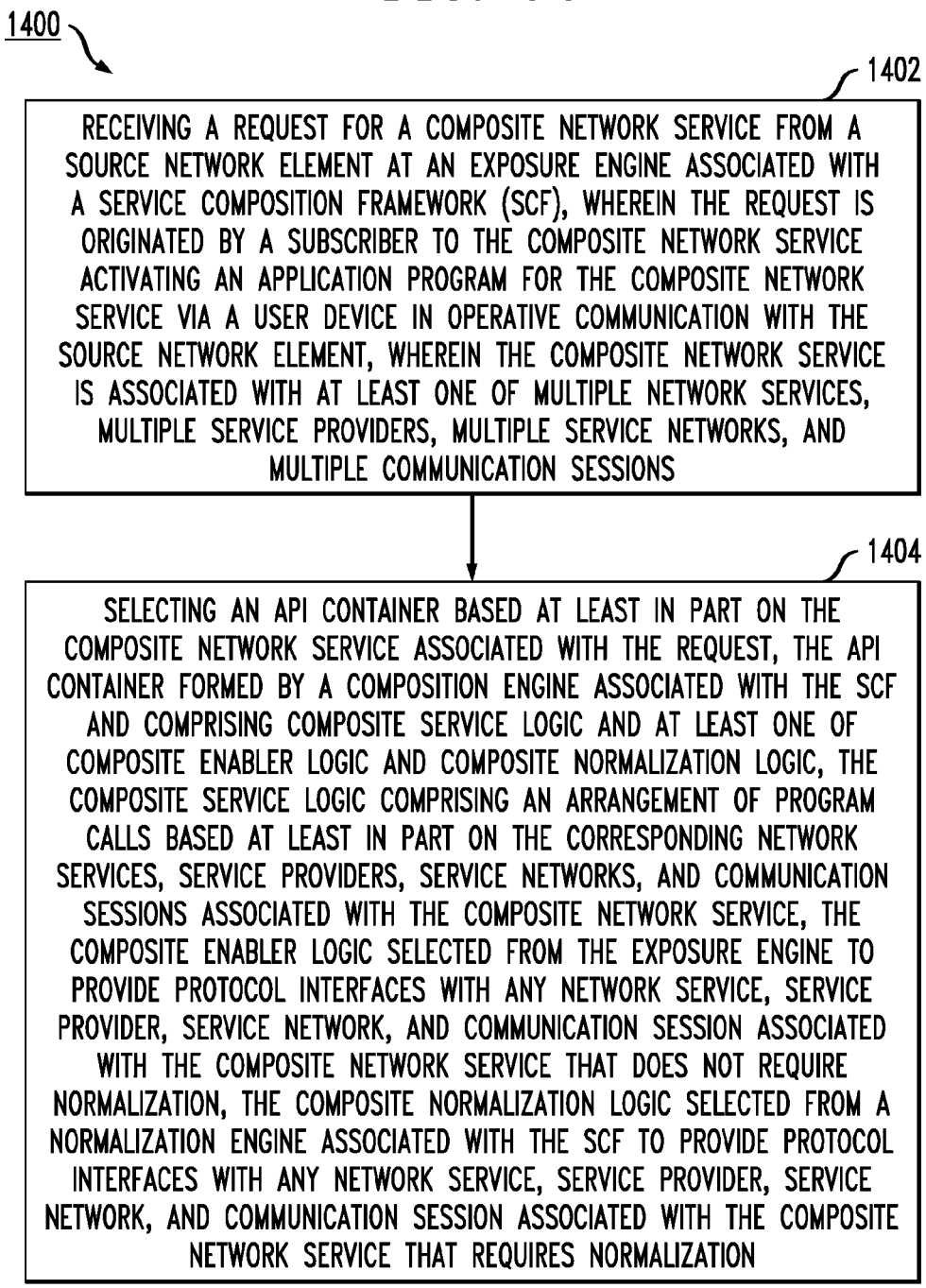
FIG. 14 is a flow chart of another exemplary embodiment of a process for providing an application with an interface to a composite network service.

With reference to FIG. 14, a process 1400 for providing an application with an interface to a composite network service begins at 1402 where a request for a composite network service is received from a source network element at an exposure engine associated with a service composition framework (SCF). The request may be originated by a subscriber to the composite network service activating an application program for the composite network service via a user device in operative communication with the source network element. The composite network service is associated with at least one of multiple network services, multiple service providers, multiple service networks, and multiple communication sessions. At 1404, an API container is selected based at least in part on the composite network service associated with the request. The selected API container being formed by a composition engine associated with the SCF. The selected API containing including composite service logic and at least one of composite enabler logic and composite normalization logic. The composite service logic including an arrangement of program calls based at least in part on the corresponding network services, service providers, service networks, and communication sessions associated with the composite network service. The composite enabler logic selected from the exposure engine to provide protocol interfaces with any network service, service provider, service network, and communication session associated with the composite network service that does not require normalization. The composite normalization logic selected from a normalization engine associated with the SCF to provide protocol interfaces with any network service, service provider, service network, and communication session associated with the composite network service that requires normalization.

In another embodiment, the process 1400 also includes invoking an orchestration engine associated with the SCF to selectively process the composite service logic, composite enabler logic, and composite normalization logic in the API container to provide the composite network service in response to the request. In yet another embodiment of the process 1400, the composite network service is associated with at least one service partner associated with some corresponding service provider.

In still another embodiment of the process 1400, the API container selected in 1404 is an existing API container. In a further embodiment, the process 1400 may also include modifying the existing API container based at least in part on the request received in 1402. The modified API container may be stored in the SCF for subsequent reuse. In an alternate further embodiment, the process 1400 may also include modifying the composite service logic in the existing API container by changing the arrangement of program calls, removing an existing program call, or adding a new program call based at least in part on the corresponding network services, service providers, service networks, and communication sessions associated with the composite network service. In another alternate further embodiment, the process 1400 may also include modifying the composite enabler logic in the existing API container by removing an existing enabler component or adding a new enabler component based at least in part on the corresponding network services, service providers, service networks, and communication sessions associated with the composite network service. In yet another alternate further embodiment, the process 1400 may also include modifying the composite normalization logic in the existing API container by removing an existing normalization component or adding a new normalization component based at least in part on the corresponding network services, service providers, service networks, and communication sessions associated with the composite network service.

In yet another embodiment, the process 1400 may also include forming the API container selected in 1404 based at least in part on the request received in 1402, including forming the composite service logic, composite enabler logic, and composite normalization logic based at least in part on the corresponding network services, service providers, service networks, and communication sessions associated with the composite network service. The API container may be stored in the SCF for subsequent reuse.

Figure 15:
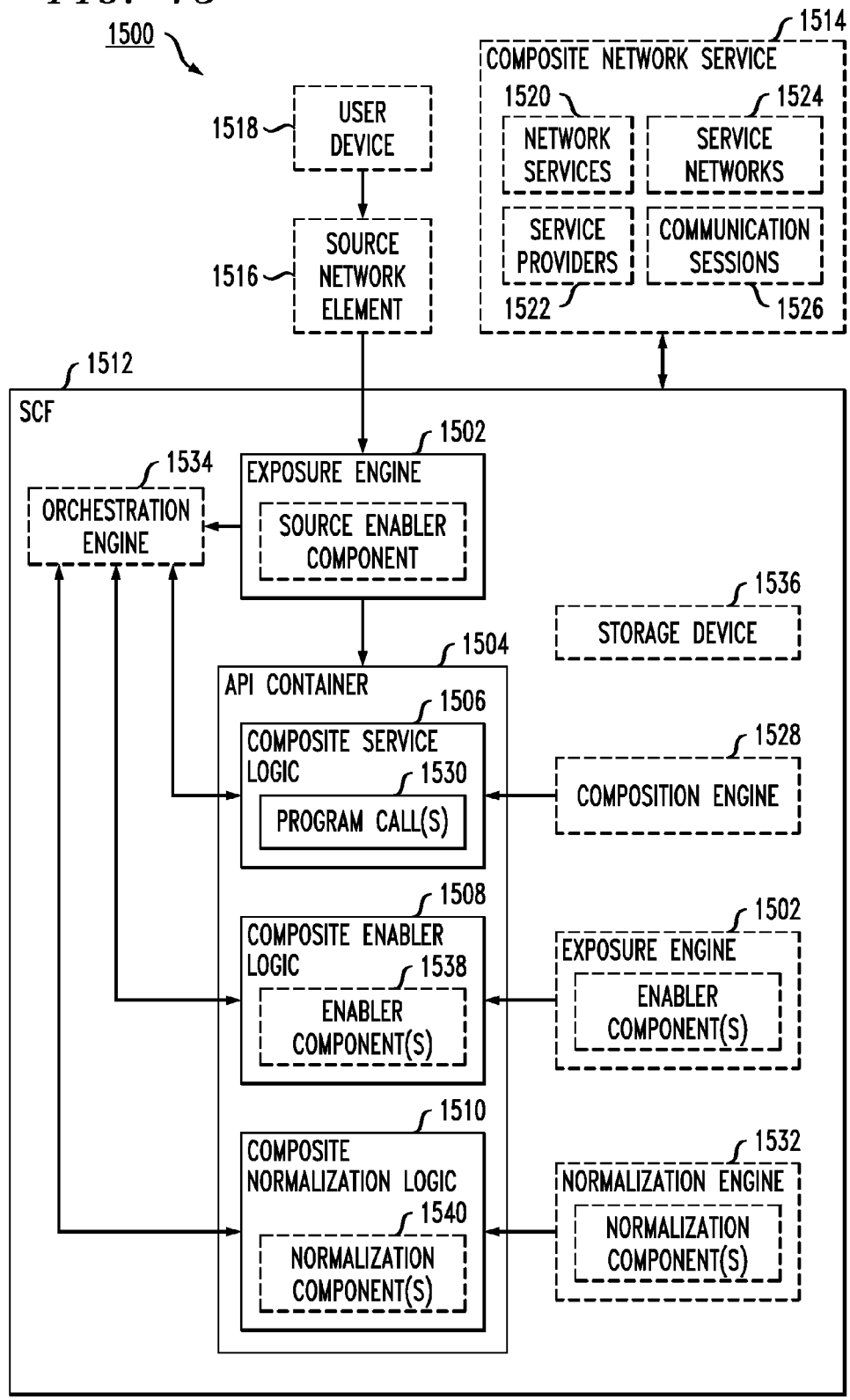
FIG. 15 is a block diagram of an exemplary embodiment of a system for providing an application with an interface to a composite network service.

With reference to FIG. 15, system 1500 for providing an application with an interface to a composite network service includes an exposure engine 1502 and an API container 1504. The API container 1504 includes composite service logic 1506 and at least one of composite enabler logic 1508 and composite normalization logic 1510. The exposure engine 1502 is associated with a service composition framework (SCF) 1512 for receiving a request for a composite network service 1514 from a source network element 1516. The request is originated by a subscriber to the composite network service 1514 activating an application program for the composite network service 1514 via a user device 1518 in operative communication with the source network element 1516. The composite network service 1514 is associated with at least one of multiple network services 1520, multiple service providers 1522, multiple service networks 1524, and multiple communication sessions 1526.

The API container 1504 is selected by the exposure engine 1502 based at least in part on the composite network service 1514 associated with the request. The API container 1504 being formed by a composition engine 1528 associated with the SCF 1512. The composite service logic 1506 including an arrangement of program calls 1530 based at least in part on the corresponding network services 1520, service providers 1522, service networks 1524, and communication sessions 1526 associated with the composite network service 1514. The composite enabler logic 1508 selected from the exposure engine 1502 to provide protocol interfaces with any network service 1520, service provider 1522, service network 1524, and communication session 1526 associated with the composite network service 1514 that does not require normalization. The composite normalization logic 1510 selected from a normalization engine 1532 associated with the SCF 1512 to provide protocol interfaces with any network service 1520, service provider 1522, service network 1524, and communication session 1526 associated with the composite network service 1514 that requires normalization.

In another embodiment, the system 1500 also includes an orchestration engine 1534 associated with the SCF 1512 and invoked by the exposure engine 1502 to selectively process the composite service logic 1506, composite enabler logic 1508, and composite normalization logic 1510 in the API container 1504 to provide the composite network service 1514 in response to the request.

In yet another embodiment, the system 1500 includes the composition engine 1528 and a storage device 1536. The composition engine 1528 forming the API container 1504 selected by the exposure engine 1502 based at least in part on the request for the composite network service 1514, including forming the composite service logic 1506, composite enabler logic 1508, and composite normalization logic 1510 based at least in part on the corresponding network services 1520, service providers 1522, service networks 1524, and communication sessions 1526 associated with the composite network service 1514. The storage device 1536 may be used for storing the API container 1504 in the SCF 1512 for subsequent reuse.

In this embodiment, the composition engine 1528 is also for modifying an existing API container 1504 based at least in part on another request for another composite network service 1514, including at least one of modifying the composite service logic 1506 in the existing API container 1504 by changing the arrangement of program calls 1530, removing an existing program call 1530, or adding a new program call 1530 based at least in part on the corresponding network services 1520, service providers 1522, service networks 1524, and communication sessions 1526 associated with the composite network service 1514, modifying the composite enabler logic 1508 in the existing API container 1504 by removing an existing enabler component 1538 or adding a new enabler component 1538 based at least in part on the corresponding network services 1520, service providers 1522, service networks 1524, and communication sessions 1526 associated with the composite network service 1514, and modifying the composite normalization logic 1510 in the existing API container 1504 by removing an existing normalization component 1540 or adding a new normalization component 1540 based at least in part on the corresponding network services 1520, service providers 1522, service networks 1524, and communication sessions 1526 associated with the composite network service 1514. The storage device 1536 may also be used for storing the modified API container 1504 in the SCF 1512 for subsequent reuse.

With reference to FIG. 16, a process 1600 for providing an application with an interface to a composite network service begins at 1602 where a request for a composite network service is received from a source network element at an exposure engine associated with a service composition framework (SCF). The request may be originated by an application developer of a corresponding application program via a user device in operative communication with the source network element. The composite network service is associated with at least one of multiple network services, multiple service providers, multiple service networks, and multiple communication sessions. At 1604, an API container is selected based at least in part on the composite network service associated with the request. The selected API container being formed by a composition engine associated with the SCF. The composite service logic including an arrangement of program calls based at least in part on the corresponding network services, service providers, service networks, and communication sessions associated with the composite network service. The composite enabler logic selected from the exposure engine to provide protocol interfaces with any network service, service provider, service network, and communication session associated with the composite network service that does not require normalization. The composite normalization logic selected from a normalization engine associated with the SCF to provide protocol interfaces with any network service, service provider, service network, and communication session associated with the composite network service that requires normalization.

In another embodiment, the process 1600 also includes invoking an orchestration engine associated with the SCF to selectively process the composite service logic, composite enabler logic, and composite normalization logic in the API container to test the ability of the SCF to provide the composite network service using the API container in response to the request. In yet another embodiment of the process 1600, the composite network service is associated with at least one service partner associated with some corresponding service provider.

In still another embodiment of the process 1600, the API container selected in 1604 is an existing API container. In a further embodiment, the process 1600 may also include modifying the existing API container based at least in part on the request received in 1602. The modified API container may be stored in the SCF for subsequent reuse. In an alternate further embodiment, the process 1600 may also include modifying the composite service logic in the existing API container by changing the arrangement of program calls, removing an existing program call, or adding a new program call based at least in part on the corresponding network services, service providers, service networks, and communication sessions associated with the composite network service. In another alternate further embodiment, the process 1600 may also include modifying the composite enabler logic in the existing API container by removing an existing enabler component or adding a new enabler component based at least in part on the corresponding network services, service providers, service networks, and communication sessions associated with the composite network service. In yet another alternate further embodiment, the process 1600 may also include modifying the composite normalization logic in the existing API container by removing an existing normalization component or adding a new normalization component based at least in part on the corresponding network services, service providers, service networks, and communication sessions associated with the composite network service.

In yet another embodiment, the process 1600 may also include forming the API container selected in 1604 based at least in part on the request received in 1602, including forming the composite service logic, composite enabler logic, and composite normalization logic based at least in part on the corresponding network services, service providers, service networks, and communication sessions associated with the composite network service. The API container may be stored in the SCF for subsequent reuse.

It is understood that the suites, platforms, servers, and other structural resources may be implemented through any suitable combination of processors, computers, work stations, computer systems, and accompanying peripheral devices. The computer equipment can include any suitable combination of devices for user interfaces, including portable devices, mobile devices, wireless devices, input devices, pointing devices, display devices, and monitors.

The above description merely provides a disclosure of particular embodiments of the invention and is not intended for the purposes of limiting the same thereto. As such, the invention is not limited to only the above-described embodiments. Rather, it is recognized that one skilled in the art could conceive alternative embodiments that fall within the scope of the invention.

We claim:

1. A method of providing an application with an interface to a composite network service, comprising:
   receiving a request, for the composite network service, from a source network element at an exposure engine associated with a service composition framework (SCF), wherein the request is originated by a subscriber to the composite network service activating an application program for the composite network service via a user device in operative communication with the source network element, wherein the composite network service is associated with at least one of multiple network services, multiple service providers, multiple service networks, and multiple communication sessions;
   selecting an application program interface (API) container based at least in part on the composite network service associated with the request, wherein the API container is formed by a composition engine associated with the SCF and comprises a composite service logic and at least one of a composite enabler logic and a composite normalization logic, wherein the composite service logic comprises an arrangement of program calls based at least in part on the corresponding network services, service providers, service networks, and communication sessions associated with the composite network service, wherein the composite enabler logic is selected from the exposure engine to provide protocol interfaces with any network service, service provider, service network, and communication session associated with the composite network service that does not require normalization, and wherein the composite normalization logic is selected from a normalization engine associated with the SCF to provide protocol interfaces with any network service, service provider, service network, and communication session associated with the composite network service that requires normalization; and
   invoking an orchestration engine associated with the SCF to selectively process the composite service logic, composite enabler logic, and composite normalization logic in the API container to provide the composite network service in response to the request.

2. The method set forth in claim 1 wherein the composite network service is associated with at least one service partner associated with some corresponding service provider.

3. The method set forth in claim 1 wherein the selected API container is an existing API container.

4. The method set forth in claim 3, further comprising:
   modifying the existing API container based at least in part on the received request; and
   storing the modified API container in the SCF for subsequent reuse.

5. The method set forth in claim 4, further comprising:
   modifying the composite service logic in the existing API container by changing the arrangement of program calls, removing an existing program call, or adding a new program call based at least in part on the corresponding network services, service providers, service networks, and communication sessions associated with the composite network service.

6. The method set forth in claim 4, further comprising:
   modifying the composite enabler logic in the existing API container by removing an existing enabler component or adding a new enabler component based at least in part on the corresponding network services, service providers, service networks, and communication sessions associated with the composite network service.

7. The method set forth in claim 4, further comprising:
   modifying the composite normalization logic in the existing API container by removing an existing normalization component or adding a new normalization component based at least in part on the corresponding network services, service providers, service networks, and communication sessions associated with the composite network service.

8. The method set forth in claim 1, further comprising:
   forming the selected API container based at least in part on the received request, including forming the composite service logic, composite enabler logic, and composite normalization logic based at least in part on the corresponding network services, service providers, service networks, and communication sessions associated with the composite network service; and
   storing the API container in the SCF for subsequent reuse.

9. An apparatus for providing an application with an interface to a composite network service, comprising:
   an exposure processor configured to use an exposure engine associated with a service composition framework (SCF) for receiving a request, for the composite network service, from a source network element, wherein the request is originated by a subscriber to the composite network service activating an application program for the composite network service via a user device in operative communication with the source network element, wherein the composite network service is associated with at least one of multiple network services, multiple service providers, multiple service networks, and multiple communication sessions;
   an application program interface (API) container selected by the exposure engine based at least in part on the composite network service associated with the request, wherein the API container is formed by a composition engine associated with the SCF and comprises:
      a composite service logic comprising an arrangement of program calls based at least in part on the corresponding network services, service providers, service networks, and communication sessions associated with the composite network service; and
      at least one of a composite enabler logic and a composite normalization logic, wherein the composite enabler logic is selected from the exposure engine to provide protocol interfaces with any network service, service provider, service network, and communication session associated with the composite network service that does not require normalization, and wherein the composite normalization logic is selected from a normalization engine associated with the SCF to provide protocol interfaces with any network service, service provider, service network, and communication session associated with the composite network service that requires normalization; and
   an orchestration processor configured to use an orchestration engine associated with the SCF and invoked by the exposure engine to selectively process the composite service logic, composite enabler logic, and composite normalization logic in the API container to provide the composite network service in response to the request.

10. The apparatus set forth in claim 9, further comprising:
the composition engine for forming the API container selected by the exposure engine based at least in part on the request for the composite network service, including forming the composite service logic, composite enabler logic, and composite normalization logic based at least in part on the corresponding network services, service providers, service networks, and communication sessions associated with the composite network service; and a storage device for storing the API container in the SCF for subsequent reuse, wherein the composition engine is also for modifying an existing API container based at least in part on another request for another composite network service, including at least one of modifying the composite service logic in the existing API container by changing the arrangement of program calls, removing an existing program call, or adding a new program call based at least in part on the corresponding network services, service providers, service networks, and communication sessions associated with the composite network service, modifying the composite enabler logic in the existing API container by removing an existing enabler component or adding a new enabler component based at least in part on the corresponding network services, service providers, service networks, and communication sessions associated with the composite network service, and modifying the composite normalization logic in the existing API container by removing an existing normalization component or adding a new normalization component based at least in part on the corresponding network services, service providers, service networks, and communication sessions associated with the composite network service; and wherein the storage device is also for storing the modified API container in the SCF for subsequent reuse.

11. A method of providing an application with an interface to a composite network service, comprising:
receiving a request, for the composite network service, from a source network element at an exposure engine associated with a service composition framework (SCF), wherein the request is originated by an application developer of a corresponding application program via a user device in operative communication with the source network element, wherein the composite network service is associated with at least one of multiple network services, multiple service providers, multiple service networks, and multiple communication sessions;

selecting an application program interface (API) container based at least in part on the composite network service associated with the request, wherein the API container is formed by a composition engine associated with the SCF and comprises a composite service logic and at least one of a composite enabler logic and a composite normalization logic, wherein the composite service logic comprises an arrangement of program calls based at least in part on the corresponding network services, service providers, service networks, and communication sessions associated with the composite network service, wherein the composite enabler logic is selected from the exposure engine to provide protocol interfaces with any network service, service provider, service network, and communication session associated with the composite network service that does not require normalization, and wherein the composite normalization logic is selected from a normalization engine associated with the SCF to provide protocol interfaces with any network service, service provider, service network, and communication session associated with the composite network service that requires normalization; and invoking an orchestration engine associated with the SCF to selectively process the composite service logic, composite enabler logic, and composite normalization logic in the API container to test the ability of the SCF to provide the composite network service using the API container in response to the request.

12. The method set forth in claim 11 wherein the composite network service is associated with at least one service partner associated with some corresponding service provider.

13. The method set forth in claim 11 wherein the selected API container is an existing API container.

14. The method set forth in claim 13, further comprising:
modifying the existing API container based at least in part on the received request; and
storing the modified API container in the SCF for subsequent reuse.

15. The method set forth in claim 14, further comprising:
modifying the composite service logic in the existing API container by changing the arrangement of program calls, removing an existing program call, or adding a new program call based at least in part on the corresponding network services, service providers, service networks, and communication sessions associated with the composite network service.

16. The method set forth in claim 14, further comprising:
modifying the composite enabler logic in the existing API container by removing an existing enabler component or adding a new enabler component based at least in part on the corresponding network services, service providers, service networks, and communication sessions associated with the composite network service.

17. The method set forth in claim 14, further comprising:
modifying the composite normalization logic in the existing API container by removing an existing normalization component or adding a new normalization component based at least in part on the corresponding network services, service providers, service networks, and communication sessions associated with the composite network service.

18. The method set forth in claim 11, further comprising:
forming the selected API container based at least in part on the received request including forming the composite service logic, composite enabler logic, and composite normalization logic based at least in part on the corresponding network services, service providers, service networks, and communication sessions associated with the composite network service; and
storing the API container in the SCF for subsequent reuse.

* * * * *